United States Patent
Tran et al.

(10) Patent No.: US 11,683,674 B1
(45) Date of Patent: Jun. 20, 2023

(54) ACCELERATED CELL SEARCH AND SELECTION

(71) Applicant: T-Mobile USA, Inc., Bellevue, WA (US)

(72) Inventors: Antoine T. Tran, Bellevue, WA (US); Emile Tran, Sammamish, WA (US); Julio Costa, Tampa, FL (US)

(73) Assignee: T-Mobile USA, Inc., Bellevue, WA (US)

( * ) Notice: Subject to any disclaimer, the term of this patent is extended or adjusted under 35 U.S.C. 154(b) by 145 days.

(21) Appl. No.: 17/238,175

(22) Filed: Apr. 22, 2021

(51) Int. Cl.
| | |
|---|---|
| *H04W 8/00* | (2009.01) |
| *G06N 20/00* | (2019.01) |
| *H04W 60/04* | (2009.01) |
| *H04W 48/20* | (2009.01) |

(52) U.S. Cl.
CPC ............ *H04W 8/005* (2013.01); *G06N 20/00* (2019.01); *H04W 48/20* (2013.01); *H04W 60/04* (2013.01)

(58) Field of Classification Search
CPC ..... H04W 8/005; H04W 48/20; H04W 60/04; G06N 20/00
See application file for complete search history.

(56) References Cited

U.S. PATENT DOCUMENTS

| | | | | |
|---|---|---|---|---|
| 2010/0273485 | A1* | 10/2010 | Huang | H04W 36/34 455/435.3 |
| 2020/0267640 | A1* | 8/2020 | Choe | H04W 48/18 |
| 2022/0279399 | A1* | 9/2022 | Liu | H04W 36/245 |

FOREIGN PATENT DOCUMENTS

CN 101686474 * 3/2010

* cited by examiner

*Primary Examiner* — Steven H Nguyen
(74) *Attorney, Agent, or Firm* — Barta, Jones & Foley, PLLC (57) ABSTRACT

Solutions for accelerating cell search and selection by a user equipment (UE) include: detecting, by the UE, a network exit; determining, by the UE, a network reentry condition; based on at least mobility data for the UE and a network connectivity context history, determining, by the UE, using a machine learning (ML) component, a set of priority reentry cells; attempting network reentry with the set of priority reentry cells; and based on at least failing network reentry with the set of priority reentry cells, attempting network reentry with a cell search. In some examples, mobility data for the UE is also used for determining the set of priority reentry cells. By searching the set of priority reentry cells first, rather than starting with a blind search, the UE may save not only battery power, but also reconnect to the network more quickly, thereby improving the user experience.

20 Claims, 9 Drawing Sheets

ACCELERATED CELL SEARCH AND SELECTION

BACKGROUND

When a user equipment (UE) attempts to reenter a network (e.g., a cellular network) after a network exit, such as from a coverage loss or a controlled exit (e.g., shut-down of the transceiver or the entire UE), the UE performs a search for a network cell. There is a procedure for this, sometimes referred to as a blind cell search, in which the UE attempts to identify cells within range of the UE's transceiver, selects one or more, and attempts to register with at least one cell. Unfortunately, this blind cell search process takes time and uses battery power.

SUMMARY

The following summary is provided to illustrate examples disclosed herein, but is not meant to limit all examples to any particular configuration or sequence of operations.

Solutions for accelerating cell search and selection by a user equipment (UE) include: detecting, by the UE, a network exit; determining, by the UE, a network reentry condition; based on at least mobility data for the UE and a network connectivity context history, determining, by the UE, using a machine learning (ML) component, a set of priority reentry cells; attempting network reentry with the set of priority reentry cells; and based on at least failing network reentry with the set of priority reentry cells, attempting network reentry with a cell search. In some examples, mobility data for the UE is also used for determining the set of priority reentry cells. By searching the set of priority reentry cells first, rather than starting with a blind search, the UE may save not only battery power, but also reconnect to the network more quickly, thereby improving the user experience.

BRIEF DESCRIPTION OF THE DRAWINGS

The disclosed examples are described below with reference to the accompanying drawing figures listed below, wherein.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Solutions for accelerating cell search and selection by a user equipment (UE) include: detecting, by the UE, a network exit; determining, by the UE, a network reentry condition; based on at least mobility data for the UE and a network connectivity context history, determining, by the UE, using a machine learning (ML) component, a set of priority reentry cells; attempting network reentry with the set of priority reentry cells; and based on at least failing network reentry with the set of priority reentry cells, attempting network reentry with a cell search. In some examples, mobility data for the UE is also used for determining the set of priority reentry cells. By searching the set of priority reentry cells first, rather than starting with a blind search, the UE may save not only battery power, but also reconnect to the network more quickly, thereby improving the user experience.

Aspects of the disclosure improve the operation of cellular communications by introducing hierarchical search techniques for when a UE searches for a cell. Aspects of the disclosure operate in an unconventional manner by determining a set of priority reentry cells and attempting network reentry with the set of priority reentry cells prior. In some examples, a UE identifies cell information, such as technology (third generation (3G), fourth generation (4G), fifth generation (5G), or another), band, frequency, cell, site, area, and saves this information for different connected cells (e.g., upon a cell change) as network connectivity context history.

An ML component, such as a neural network (NN), is trained with the network connectivity context history so that, after a network exit, the UE is able to quickly locate a cell (or set of cells) that is likely to provide a successful network reentry. This may preclude the need to perform a time-consuming cell search that may also unnecessarily consume battery power. In some examples, neighbor cells are also stored and used for training the ML component. In some examples, neighbor cells are also stored and used for training the ML component. In some examples, UE mobility data is tracked, such as whether the UE has moved significantly since the network exit, so that the UE is able to determine whether the most recently used (MRU) cell is likely to be within range, or else another formerly-connected cell, that is in proximity with the UE's new position, should instead be tried.

In some examples, loss of connectivity is also stored, enabling the ML component to predict a network exit, due to coverage loss, using UE mobility data. For example, a UE is transported along a particular route regularly, and often loses coverage from a first cell at a first location along the route, and then typically reenters the network using a second cell, at a second location further along the route. When the UE is transported along the route at a later time, the ML component may predict a network exit as the UE approaches the first location along the route, and when the UE approaches the second location, the ML component may determine that network reentry should be with the second cell, ahead of performing a blond cell search.

Figure 1:
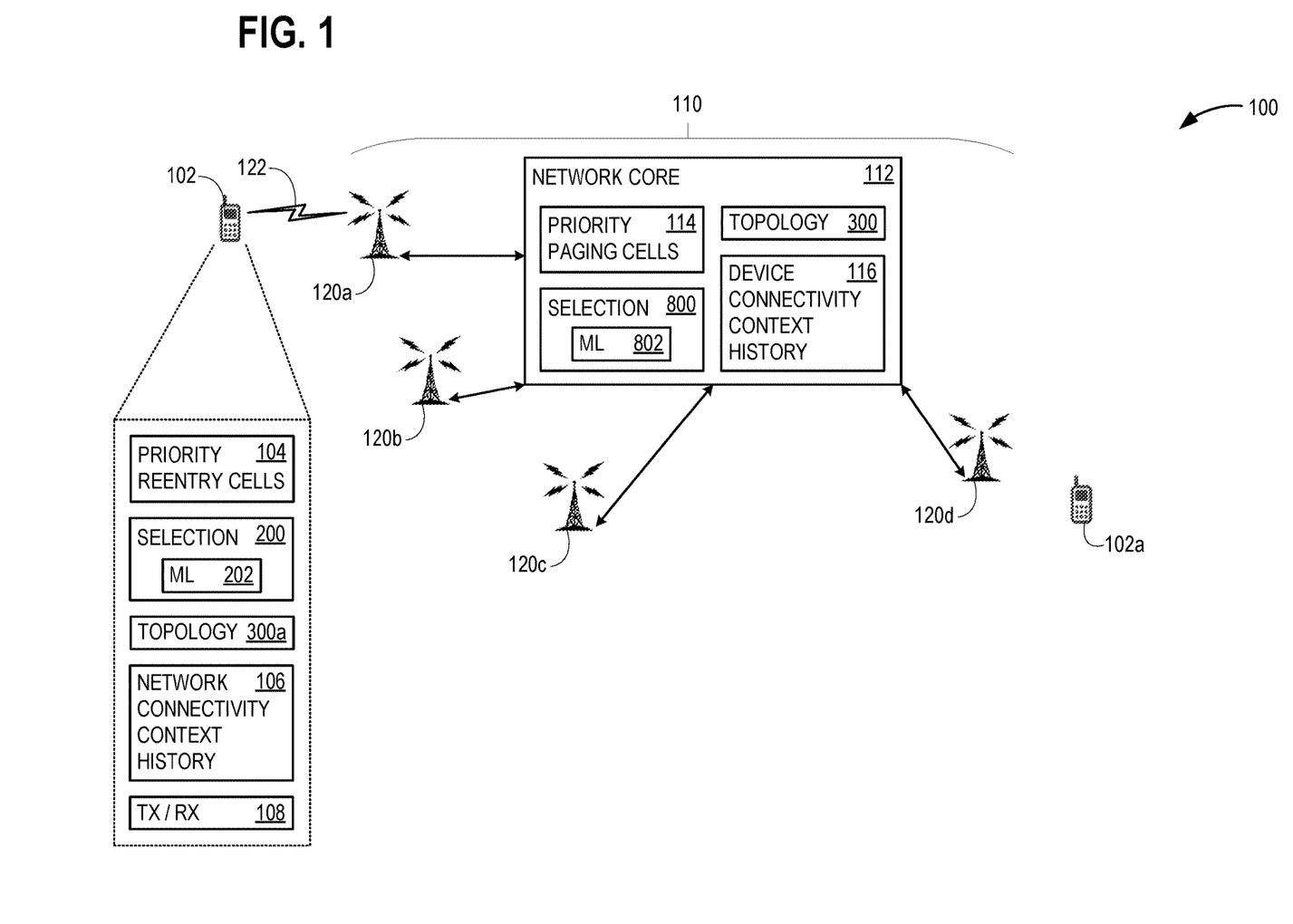
FIG. 1 illustrates an exemplary arrangement that advantageously enables accelerated cell search and selection and/or focused cellular network paging.

FIG. 1 illustrates an exemplary arrangement 100 that advantageously enables accelerated cell search and selection and/or focused cellular network paging. In arrangement 100, a UE 102 had earlier exited a network 110 and either UE 102 will be attempting to reenter network 110, or network 110 will be attempting to page UE 102. Network 110 includes a network core 112 and a plurality of cells 120a-120d, each of which is illustrated as a cell site. It should be understood that a particular cell cite may support multiple cells, such as both 5G and 4G cells, and even multiple cells with the same technology (e.g., 4G versus 5G) but different frequencies. UE 102 is in proximity of cell 120a and will be able to communicate with cell 120a over an air interface 122. Cell 120b is a neighbor cell, which is also within the range of a transceiver 108 of UE 102, but may provide a less-preferable connectivity option, due to a higher path loss over a longer range. Cells 120c and 120d are out of the range of transceiver 108 of UE 102. Another UE 102a is shown in proximity of cell 120d.

If UE 102 were to perform a blind cell search, the cell search may waste time and battery power relative to UE 102 attempting network reentry (to network 110) specifically with one or both of cells 120a or 120b. This is because, due to the location of UE 102 in proximity of cell 120a, and also within range of cell 120b, if one of cells 120a and 120b has capacity to register UE 102, network reentry may be more rapid and require fewer transmissions.

With the disclosed accelerated cell search and selection, cells 120a and 120b will be identified and prioritized in a set of priority reentry cells 104 in UE 102. Set of priority reentry cells 104 provides the set of cells with which UE 102 will attempt registration (for network reentry) ahead of performing a blind search. Set of priority reentry cells 104 is determined (predicted and prioritized) by a selection logic 200 that includes an ML component 202. Selection logic 200 and ML component 202 are described in further detail in relation to FIG. 2. In some examples, selection logic 200 uses a network connectivity context history 106, which is also described in further detail in relation to FIG. 2. In some examples, selection logic 200 uses a network topology 300a, which is described in further detail in relation to FIGS. 2 and 3.

Similarly, if network 110 were to perform global paging of UE 102 using all of base stations 102a-102d, the paging may waste network bandwidth relative to network 110 paging UE 102 with only cells 120a and 120b. This is because, due to the location of UE 102 in proximity of cell 120a, and also within range of cell 120b, UE 102 will not detect pages from either of cells 120c or 120d. Thus, cells 120c and 120d paging UE 102 is a waste of bandwidth.

With the disclosed focused cellular network paging, cells 120a and 120b will be identified in a set of priority paging cells 114 in network core 112. Set of priority paging cells 114 provides the set of cells with which network 110 will attempt paging UE 102 ahead of performing global paging. Set of priority paging cells 114 is determined by a selection logic 800 that includes an ML component 802. Selection logic 800 and ML component 802 are described in further detail in relation to FIG. 8. In some examples, selection logic 800 uses a device connectivity context history 116, which is also described in further detail in relation to FIG. 8. In some examples, selection logic 800 uses a network topology 300, which is described in further detail in relation to FIGS. 2 and 8.

Similarly with network 110 paging UE 102 with cells 120a and 120b ahead of performing blind paging, if network 110 encountered a network paging condition (e.g., a reason to page) for UE 102a, set of priority paging cells 114 would indicate cell 120d, limiting the number of cells that performed paging. In both scenarios, paging UE 102 and paging UE 102a, cell 120c is not included in the focused paging. If however, one of UE 102 or UE 102a failed to respond to paging, such as selection logic 800 determined an incorrect set of priority paging cells 114, or UE 102 or 102a were shut down, network 110 may then attempt paging with a larger set of cells that may include cell 120c.

Figure 2:
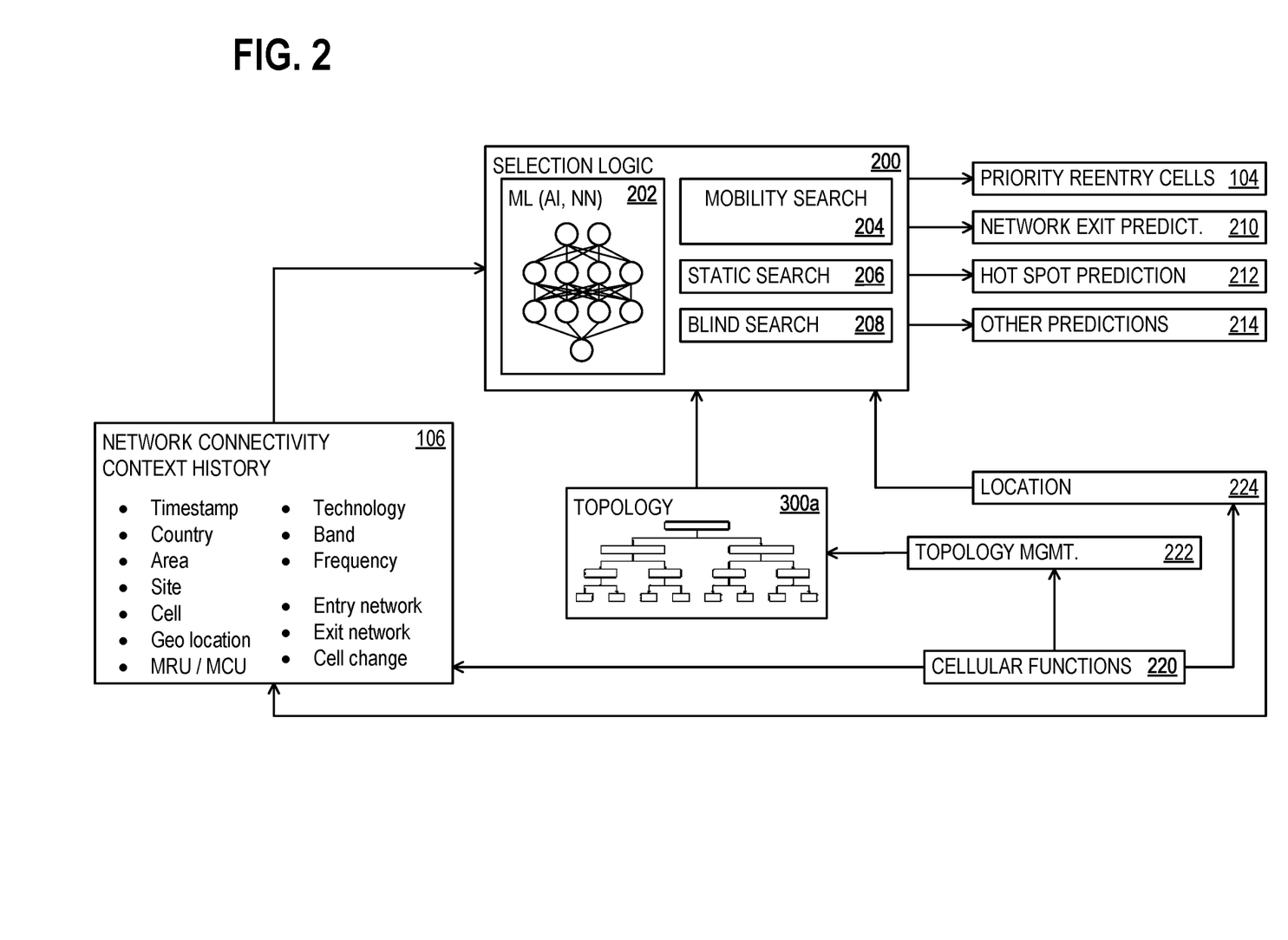
FIG. 2 illustrates components employed by a user equipment used by a user equipment (UE) for accelerated cell search and selection in the arrangement of FIG. 1.

FIG. 2 illustrates components employed by UE 102 for accelerated cell search and selection, and which may be stored or execute on UE 102. Network connectivity context history 106 is a data store of information related to cell connections, and is used to train ML component 202. Network connectivity context history 106 may include information such as timestamps of cell connections, handoffs, and coverage losses; network area identification information such as country, area, site, and cell; geographic location (e.g., derived from GPS coordinates of UE 102 or taking on the location of a connected cell as an approximation of the location of UE 102); and MRU cell and/or most commonly used (MCU) cell. Network connectivity context history 106 may also include information specific to certain cells with which UE 102 has been connected, such as technology (e.g., 3G, 4G, or 5G), band, and frequency and network entry/exit information such as identification of entry networks, exit networks, and cell changes.

Network connectivity context history 106 is collected by cellular functions 220 of UE 102, which include transceiver 108, as UE 102 moves around within the coverage of network 110. Network connectivity context history 106 is provided to selection logic 200 in order to predict and prioritize set of priority reentry cells 104 and, in some examples, other data products. In some examples, these other data products include one or more of a network exit prediction 210 (which may predict an impending coverage loss, based on a location 224 of UE 102), a hot spot prediction 212, and other predictions 214 relevant to improving user experience. For example, if UE 102 has a history of losing cell connectivity when traveling along a certain route (e.g., due to poor coverage in that area), selection logic 200 may generate network exit prediction 210 which acts as an alert to the user of UE 102. This permits the user to take preemptive remedial action, improving user experience.

In some examples, a topology 300a is also provided to selection logic 200, in order to facilitate location of neighboring cells in some area where cell information is not available in network connectivity context history 106. Topology 300a is a portion of topology 300 of FIG. 3. Whereas topology 300 may comprise topology information for the entirety (or nearly so) of network 110, topology 300a may comprise only the portion of network 110 that is in the vicinity of UE 102. This minimizes the size of topology 300a in the memory of UE 102, as well as the bandwidth used when network 110 transmits topology 300a to UE 102.

In operation, when UE 102 moves to a new network, or an area of a network (e.g., network 110) for which UE 102 does not have historically-derived information (in network connectivity context history 106) the network may transmit a portion of topology 300 to UE 102 as topology 300a. UE 102 receives topology 300a from network 110 through cellular functions 220. As UE 102 moves around in the new area of network 110, cellular functions 220 provides cell information to update both network connectivity context history 106 and also topology 300a (via a topology management component 222). In this manner, in some examples, UE 102 is able to build out its own topology information in topology 300a as it discovers cells in network 110.

ML component 202 may include artificial intelligence (AI) functionality, such as an NN, or other AI/ML logic. In some examples, an NN of ML component 202 has multiple layers, such as for determining priority reentry cells based on last known location, last known cell, or last known context. In some examples, the NN is able to determine priority reentry cells based on the MRU cell and/or neighbors of the MRU cell. Selection logic 200 is illustrated has having a mobility search logic 204, a static search logic 206, and a blind search logic 208. Mobility search logic 204 may be used, for example, when UE 102 has moved sufficiently, after a network exit and prior to a network reentry attempt, that UE 102 is unlikely to be able to register with the MRU cell. Static search logic 206 may be used, for example, when UE 102 has not moved significantly, after a network exit and prior to a network reentry attempt, so that UE 102 is likely to be able to register with the MRU cell and/or a neighbor of the MRU cell. Blind search logic 208 is used for a traditional blind cell search when registration attempts using set of priority reentry cells 104 fail.

Figure 3:
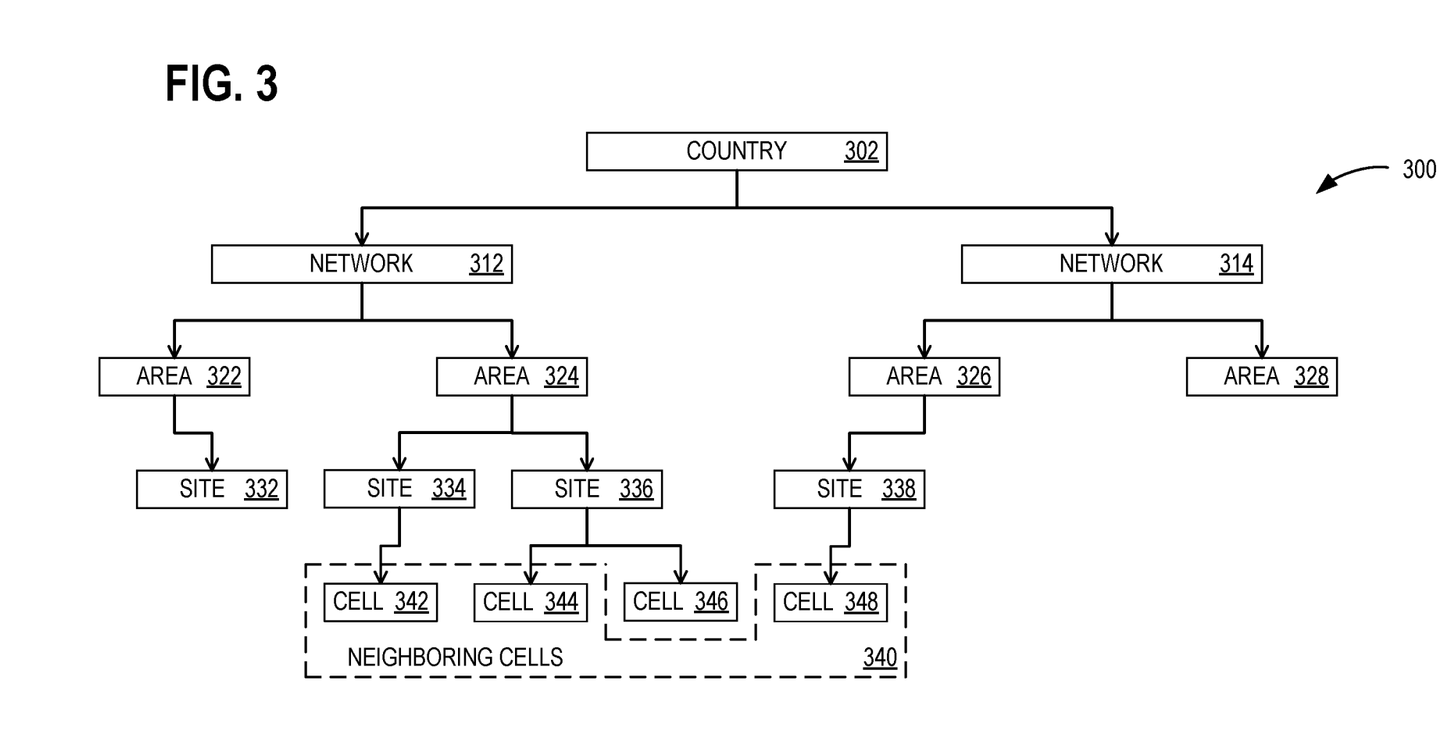
FIG. 3 illustrates a network topology, which is represented in FIGS. 2 and 8.

FIG. 3 illustrates network topology 300 in further detail. Topology 300 has a base level indexed by a country identification 302, and then divided into network identifications 312 and 314. For example, network identification 312 may identify network 110, whereas network identification 314 identifies a network of a different cellular carrier. Each network identifies regions or areas, with area identification 322 and area identification 324 for network identification 312, and area identification 326 and area identification 328 for network identification 314. It should be understood that a larger number of network identification and area identifications may be used.

An area in a network may have multiple cell sites, and each cell site may have multiple cells. As illustrated, area identification 322 has a site 332, area identification 324 has a site 334 and a site 336, and area identification 326 has a site 338. Site 334 is illustrated as having a cell 342; site 336 is illustrated as having two cells (cell 344 and cell 346); and site 336 is illustrated as having a cell 348. It should be understood that a larger number of sites and cells may be used. If UE 102 is using cell 348, and sites 334 and 338 are sufficiently close, cells 342, 344, and 348 make up neighboring cells 340. In some examples, area identification 324 corresponds with a tracking area, in which network 110 will attempt to page UE 102, if needed. That is set of priority paging cells 114 may be at least somewhat correlated with cells under area identification 324 in topology 300.

Figure 4:
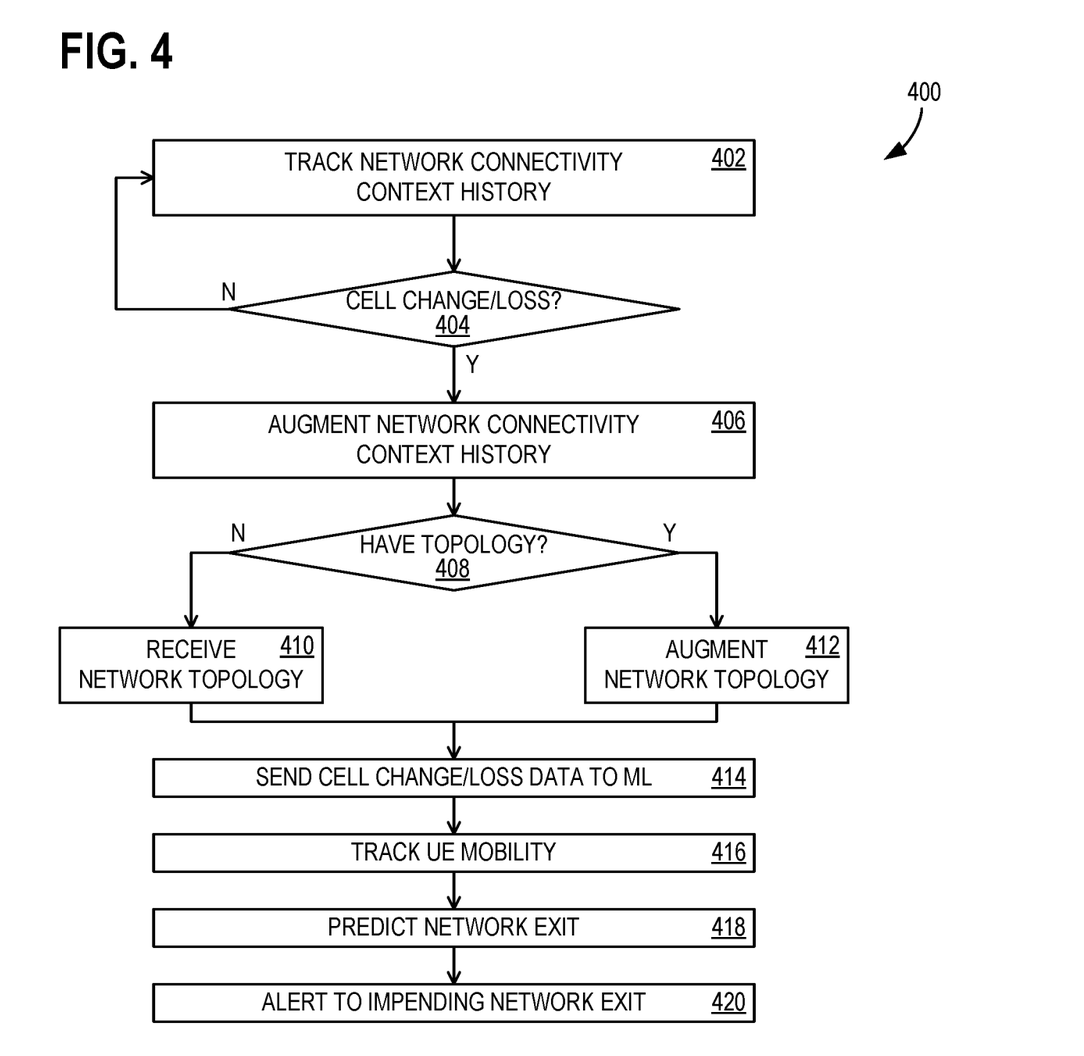
FIG. 4 illustrates a flowchart of exemplary operations that may be associated with accelerated cell search and selection in examples of the arrangement of FIG. 1.
Figure 5:
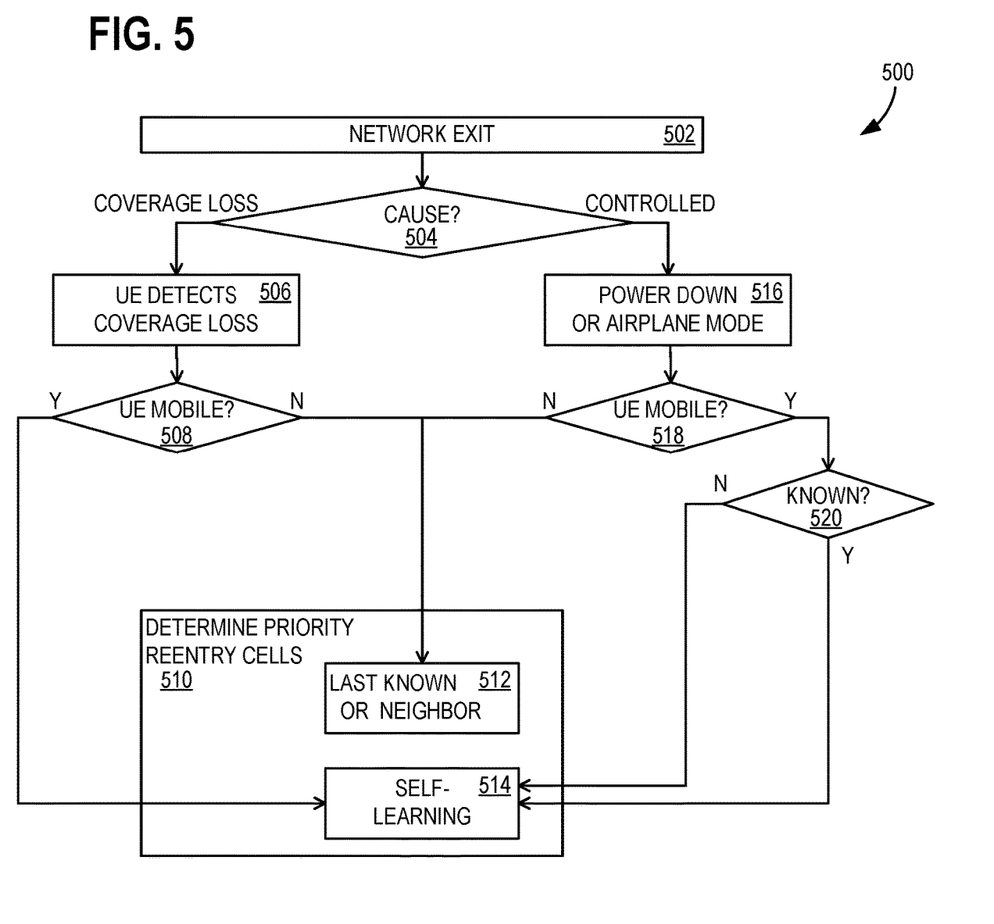
FIG. 5 illustrates another flowchart of exemplary operations that may be associated with accelerated cell search and selection in examples of the arrangement of FIG. 1.
Figure 6:
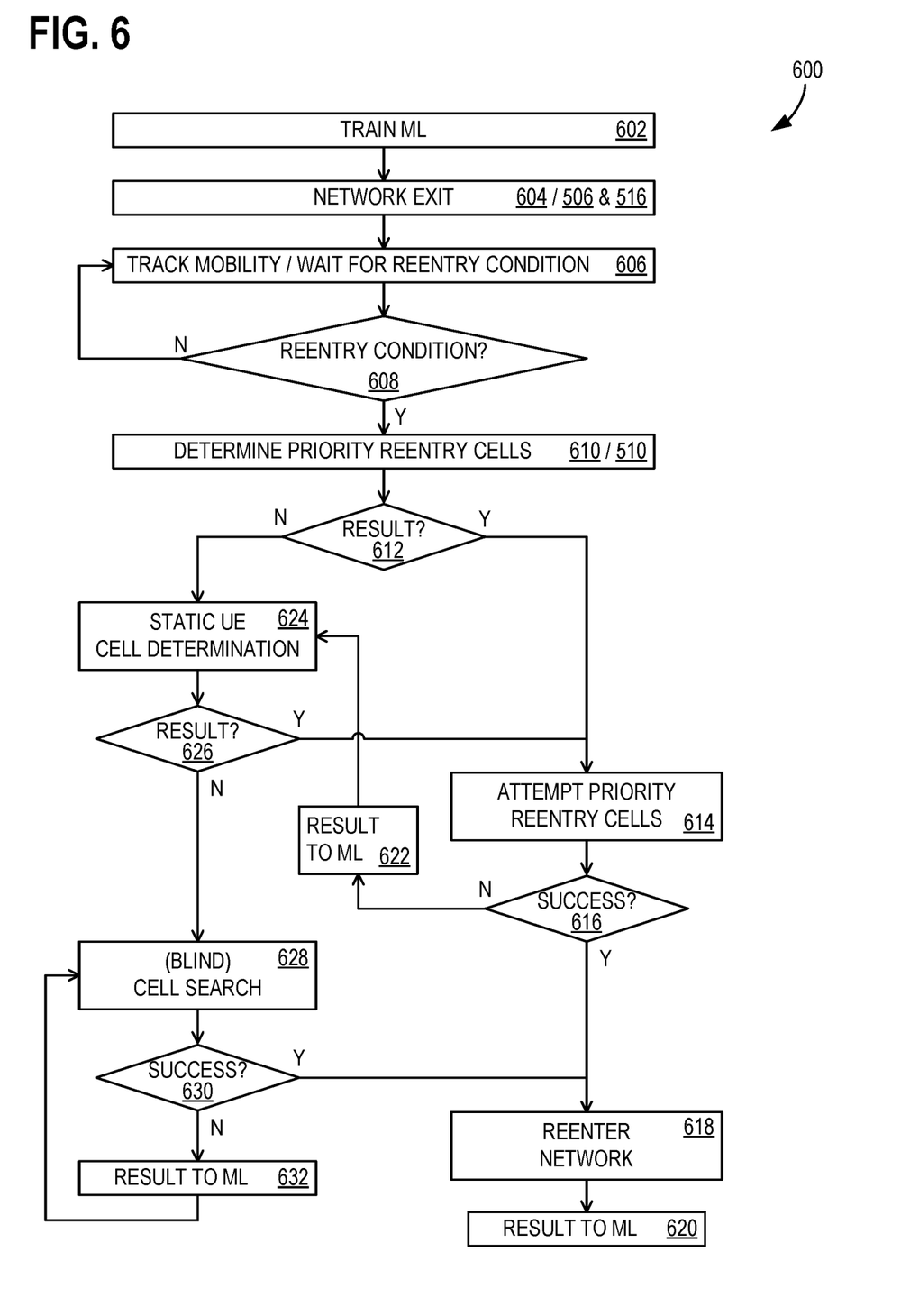
FIG. 6 illustrates another flowchart of exemplary operations that may be associated with accelerated cell search and selection in examples of the arrangement of FIG. 1.

FIGS. 4, 5, and 6 illustrate flowcharts 400, 500, and 600, respectively, of exemplary operations associated with accelerated cell search and selection in examples of arrangement 100 of FIG. 1. The operations of flowcharts 400, 500, and 600 are performed together, to accomplish accelerated cell search and selection. In some examples, at least a portion of flowcharts 400, 500, and 600 may be performed using one or more computing devices 900 of FIG. 9. Operation 402 includes tracking and storing network connectivity context history 106. Decision operation 404 determines whether there is a cell change (e.g., a handover) or a coverage loss. If so, operation 406 augments network connectivity context history 106 with information relevant to the cell change or coverage loss.

Decision operation 408 determines whether UE 102 has the relevant topology for the area, for example, whether the new cell and its neighbors are within a different network, or a different region of the network from which UE changed cells or lost coverage. If not, then based on at least a cell change, UE 102 receives a new portion of topology 300 as topology 300a, in operation 410. Otherwise, UE 102 may augment topology 300a with any newly-discovered cells, in operation 412. The cell change data is sent to ML component 202 for training, in operation 414.

UE 102 tracks mobility data for itself in operation 416 (which also corresponds with decision operations 508 and 518 of flowchart 500, and operation 606 of flowchart 600). If UE 102 is nearing an area in which coverage has historically been unreliable, operation 418 includes, based on at least the least mobility data for UE 102, predicting a network exit. Operation 420 includes generating, on UE 102, an alert for the predicted network exit. This permits the user of UE 102 to take preemptive remedial action, such as warning a called party of an impending call drop, or another action.

In FIG. 5, a network exit occurs at 502, which may be a coverage loss or a controlled exit, as indicated by 504. If the network exit comprises a coverage loss, UE 102 detects the coverage loss at 506. If the network exit comprises a controlled exit, UE 102 detects the power down or transceiver power down, at 516. Together, operations 506 and 516 include detecting, by UE 102, a network exit (which also corresponds with operation 604 of flowchart 600). Decision operation 508 includes tracking, by UE 102, the mobility data for UE 102, as does also decision operation 518 (see also operation 416 of flowchart 400). For coverage loss while UE 102 remains powered up, decision operation 508 may be ongoing, whereas for a power down of UE 102, decision operation 518 may not occur until UE 102 is powered up again.

If UE 102 is not mobile (e.g., UE 102 has remained largely stationary, within the coverage area of the MRU cell), operation 510 determines set of priority reentry cells 104 using the MRU cell, a last known cell, or a neighbor of the MRU or last known cell. This is indicated as operation 512, and may be achieved using static search logic 206 (of FIG. 2). If, however, UE 102 is mobile (e.g., UE 102 has moved sufficiently to be outside the coverage area of the MRU cell), operation 510 determines set of priority reentry cells 104 using the self-learning functionality of ML component 202. This is indicated as operation 514, and may be achieved using mobility search logic 204 (of FIG. 2). A decision operation 520 determines whether UE 102 is able to determine its location, which is an issue that may be more likely to occur in a power down event than a mere loss of coverage while powered up. Even if the location of UE 102 is unknown, UE 102 may still use mobility search logic 204, although the determination may be based on most commonly used cells (e.g., a MCU cell), rather than based on the location of UE 102. In some examples, set of priority reentry cells 104 is predicted based on successful prior connections, and prioritized based on at least historical usage and/or performance (e.g., bandwidth, error rates, drop rates), such that cells with a higher likelihood of connecting and performing well may be attempted ahead of cells with poorer performance.

Overall, operation 510 includes, based on at least mobility data for UE 102 and a network connectivity context history, determining, by UE 102, using ML component 202, set of priority reentry cells 104. This corresponds with operation 610 of flowchart 600. In some examples, set of priority reentry cells 104 identifies at least one cell feature selected from the list consisting of: a cellular network technology, a cellular band, and a frequency. In some examples, set of priority reentry cells 104 comprises a single cell.

In FIG. 6, operation 602 includes training ML component 202, both pre-deployment training, and ongoing training with network connectivity context history 106. Operation 604 includes detecting, by UE 102, a network exit. (See also operations 506 and 516 of flowchart 500.) In some examples, the network exit comprises a coverage loss or a controlled exit. Operation 606 includes tracking, by UE 102, the mobility data for UE 102, which is also described in decision operations 508 and 518. Decision operation 608 determines, by UE 102, a network reentry condition. In some examples, the network reentry condition comprises an automatic reentry attempt or a controlled reentry attempt. For example, in some scenarios, after a coverage loss, UE 102 may automatically attempt network reentry without involvement of the user. This may occur when, for example, UE 102 is in the user's pocket or bag, and the user is unaware that UE 102 lost coverage. In some scenarios, after the user powers down UE 102, or just transceiver 108 of UE 102 (e.g., airplane mode), when the user powers UE 102 or transceiver 108 back up, this is a controlled reentry attempt (because it occurs under the control of the user).

Operation 610 includes, based on at least mobility data for UE 102 and network connectivity context history 106, determining, by UE 102, using ML component 202, set of priority reentry cells 104. Operation 610 corresponds with operation 510 of FIG. 5. Decision operation 612 determines whether ML component 202 is able to produce set of priority reentry cells 104, or instead whether ML component 202 lacks sufficient input data (e.g., location of UE 102, topology 300*a*) to provide meaningful results. If ML component 202 is able to produce set of priority reentry cells 104, operation 614 includes attempting network reentry with set of priority reentry cells 104. In some examples, attempting network reentry comprises attempting network reentry into a 4G cellular network. In some examples, attempting network reentry comprises attempting network reentry into a 5G cellular network.

Decision operation 616 determines whether the network reentry attempt of operation 614 is successful. If operation 614 is successful, UE 102 registers with a cell and reenters network 110 as operation 618. This success is saved to network connectivity context history 106, and used to further train ML component 202. Thus, operation 620 includes learning, by ML component 202, a network reentry attempt result. If, however, operation 614 fails (is not successful), the result is also saved to network connectivity context history 106, and used to further train ML component 202 at 622. Thus, operation 622 also includes learning, by ML component 202, a network reentry attempt result.

Selection logic 200 (of FIG. 2) may then turn to a static UE cell determination (e.g., operation 512 of FIG. 5, using static search logic 206, at 624. Flowchart 600 may also reach operation 624 earlier, as a result of decision operation 612 determining that ML component 202 is unable to produce set of priority reentry cells 104. Operation 624 includes, based on at least the mobility data for UE 102, network connectivity context history 106, and ML component 202 not providing a successful set of priority reentry cells 104, determining, by UE 102, set of priority reentry cells 104 based on at least mobility data for UE 102 and network topology 300*a*. Decision operation 626 determines whether operation 624 is able to successfully produce set of priority reentry cells 104, or instead whether operation 624 lacks sufficient input data (e.g., location of UE 102, topology 300*a*, et.) to provide meaningful results.

If operation 624 is successful, and produces a result, flowchart 600 returns to operation 614 to attempt network reentry with the new set of priority reentry cells 104. Otherwise, a traditional cell search may be attempted at 628. Operation 628 includes, based on at least failing network reentry with set of priority reentry cells 104, attempting network reentry with a cell search. In some examples, this comprises a blind cell search. Decision operation 630 determines whether operation 628 is successful. If so, flowchart moves to 618, as described above. Otherwise, this failure is recorded in network connectivity context history 106, and used to further train ML component 202 at 632. Thus, operation 632 also includes learning, by ML component 202, a network reentry attempt result. Flowchart 600 then returns to operation 628 for additional blind searching until a cell is found.

Figure 7:
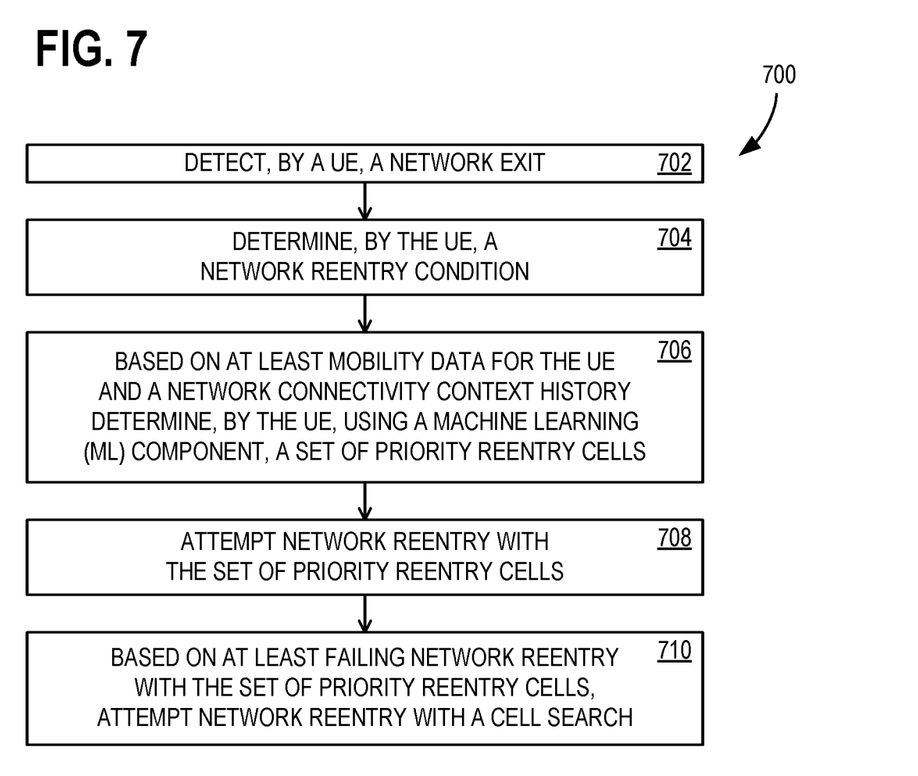
FIG. 7 illustrates another flowchart of exemplary operations that may be associated with accelerated cell search and selection in examples of the arrangement of FIG. 1.

FIG. 7 illustrates a flowchart 700 of exemplary operations associated with accelerated cell search and selection in examples of arrangement 100 of FIG. 1. In some examples, at least a portion of flowchart 700 may be performed using one or more computing devices 900 of FIG. 9. Operation 702 includes detecting, by the UE, a network exit. Operation 704 includes determining, by the UE, a network reentry condition. Operation 706 includes, based on at least mobility data for the UE and a network connectivity context history, determining, by the UE, using an ML component, a set of priority reentry cells. Operation 708 includes attempting network reentry with the set of priority reentry cells. Operation 710 includes, based on at least failing network reentry with the set of priority reentry cells, attempting network reentry with a cell search.

Figure 8:
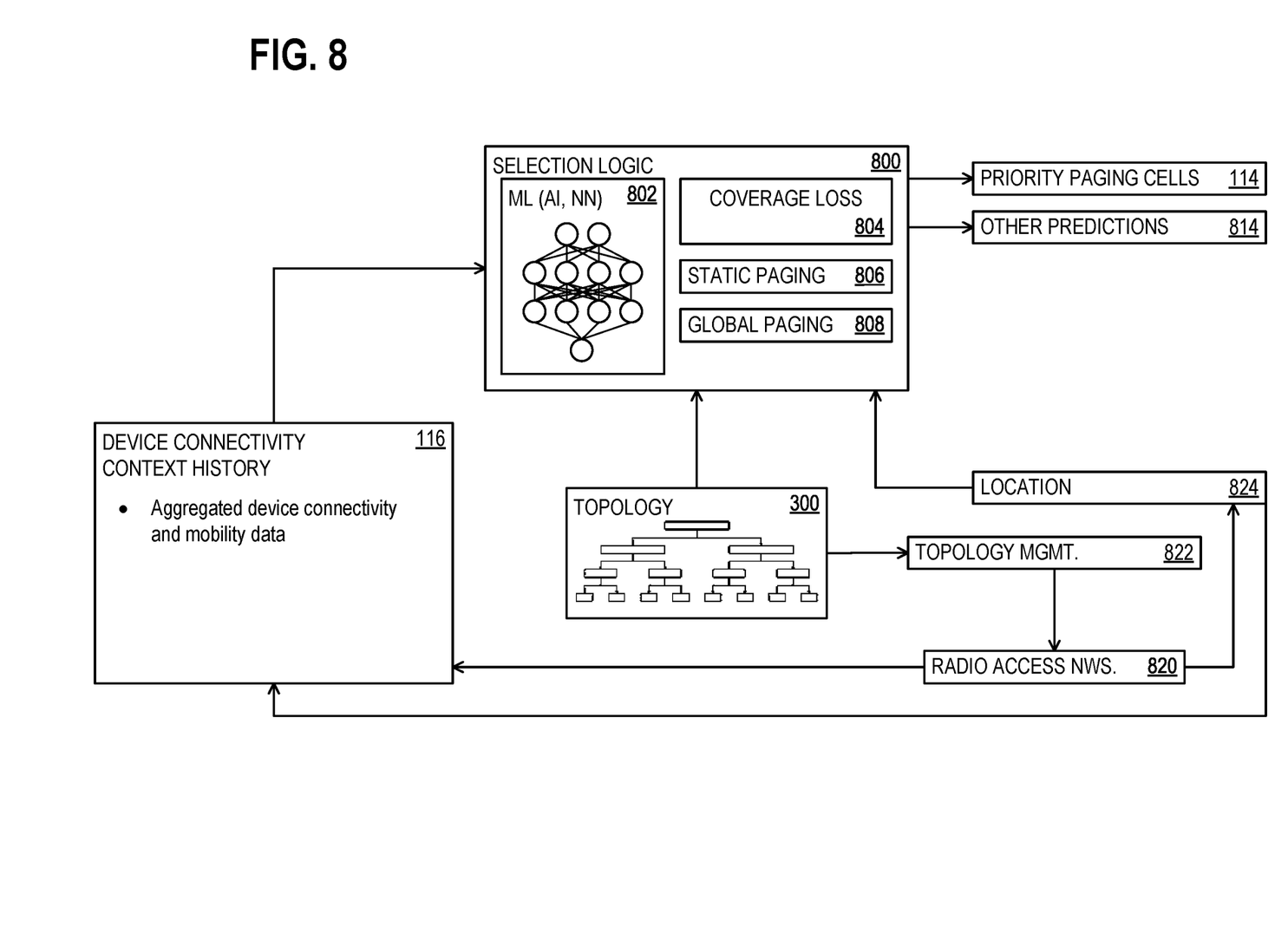
FIG. 8 illustrates components employed by a network core for focused cellular network paging in the arrangement of FIG. 1.

FIG. 8 illustrates components employed by network core 112 in arrangement 100 of FIG. 1, and which may be stored or execute on network core 112. Device connectivity context history 116 is a data store of information related to aggregated UE network entry and exit events, and is used to train ML component 802. Device connectivity context history 116 may include information such as timestamps of network entry and exit events, and exit reasons, such as failure to respond by a UE (e.g. a presumed coverage loss) or a controlled exit (e.g., intentional UE power-down or activation of airplane mode that turns off the UE's cellular transceiver).

Device connectivity context history 116 is collected by radio access networks 820, which include cells of network 110 (e.g., cells 120*a*-120*d*). Device connectivity context history 116 is provided to selection logic 800 in order to produce set of priority paging cells 114 and, in some examples, other predictions 814 relevant to improving efficiency, reliability, speed, or other operational aspects of network 110. For example, if a large number of UEs has a history of losing cell connectivity when traveling along a certain route (e.g., due to poor coverage in that area), selection logic 800 may generate a prediction that UEs exiting network 110 at a first cell will reappear at a second cell. Such a prediction may be useful for producing a map of locations to prioritize improving coverage (e.g., by suggesting installation of a new cell between the first cell and the second cell). Location information 824 may be provided by radio access networks 820. In some examples, topology 300 is also provided to selection logic 800, in order to facilitate identification of neighboring cells in a tracking area where a UE is likely to receive paging. A topology management component 822 extracts a relevant portion of topology 300 to provide to UE 102 as topology 300a (via radio access networks 820), when needed by UE 102.

ML component 802 may include AI functionality, such as an NN, or other AI/ML logic. In some examples, an NN of ML component 802 has multiple layers, such as for determining priority paging cells based on last known location, last known cell, or last known context. In some examples, the NN is able to determine priority paging cells based on the MRU cell and/or neighbors of the MRU cell. Selection logic 800 is illustrated has having a coverage loss paging logic 804, a static paging logic 806, and a global paging logic 808. Coverage loss paging logic 804 may be used, for example, when UE 102 fails to respond, and network 110 is unable to determine a reason for the failure to respond. In such scenarios, it is possible that UE 102, after a network exit and prior to a paging attempt, that has moved sufficiently that UE 102 is unlikely to respond to a page from the MRU cell. Static paging logic 806 may be used, for example, when UE 102 has performed a controlled exit, and so may have remained in place until the user powers UE 102 up again. Global paging logic 808 is used for a traditional global paging when paging attempts using set of priority paging cells 114 fail.

Figure 9:
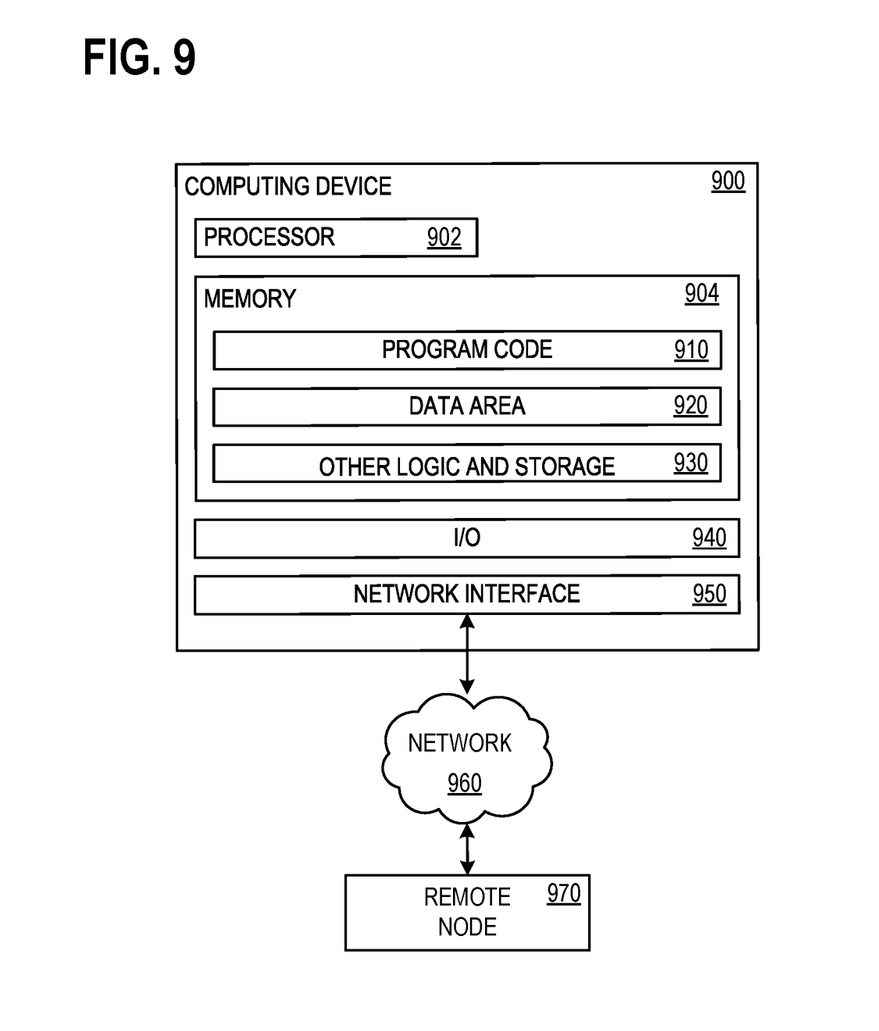
FIG. 9 illustrates a block diagram of a computing device suitable for implementing various aspects of the disclosure.

FIG. 9 illustrates a block diagram of computing device 900 that may be used as a component of arrangement 100, for example, as any component described herein that may require computational or storage capacity. Computing device 900 has at least a processor 902 and a memory 904 that holds program code 910, data area 920, and other logic and storage 930. Memory 904 is any device allowing information, such as computer executable instructions and/or other data, to be stored and retrieved. For example, memory 904 may include one or more random access memory (RAM) modules, flash memory modules, hard disks, solid-state disks, persistent memory devices, and/or optical disks. Program code 910 comprises computer executable instructions and computer executable components including any instructions necessary to perform operations described herein. Data area 920 holds any data necessary to perform operations described herein. Memory 904 also includes other logic and storage 930 that performs or facilitates other functions disclosed herein or otherwise required of computing device 900. An input/output (I/O) component 940 facilitates receiving input from users and other devices and generating displays for users and outputs for other devices. A network interface 950 permits communication over a network 960 with a remote node 970, which may represent another implementation of computing device 900.

Additional Examples

An example method of cell selection by a UE comprises: detecting, by the UE, a network exit; determining, by the UE, a network reentry condition; based on at least mobility data for the UE and a network connectivity context history, determining, by the UE, using an ML component, a set of priority reentry cells; attempting network reentry with the set of priority reentry cells; and based on at least failing network reentry with the set of priority reentry cells, attempting network reentry with a cell search.

An example system for cell selection by a UE comprises: a processor; and a computer-readable medium storing instructions that are operative upon execution by the processor to: detect, by the UE, a network exit; determine, by the UE, a network reentry condition; based on at least mobility data for the UE and a network connectivity context history, determine, by the UE, using an ML component, a set of priority reentry cells; attempt network reentry with the set of priority reentry cells; and based on at least failing network reentry with the set of priority reentry cells, attempt network reentry with a cell search.

One or more example computer storage devices has computer-executable instructions stored thereon, which, upon execution by a computer, cause the computer to perform operations comprising: detecting, by a UE, a network exit; determining, by the UE, a network reentry condition; based on at least mobility data for the UE and a network connectivity context history, determining, by the UE, using an ML component, a set of priority reentry cells; attempting network reentry with the set of priority reentry cells; and based on at least failing network reentry with the set of priority reentry cells, attempting network reentry with a cell search.

Alternatively, or in addition to the other examples described herein, examples include any combination of the following:

learning, by the ML component, a network reentry attempt result;

based on at least the mobility data for the UE, the network connectivity context history, and the ML component not providing a successful set of priority reentry cells, determining, by the UE, the set of priority reentry cells based on at least mobility data for the UE and a network topology;

the set of priority reentry cells identifies at least one cell feature selected from the list consisting of: a cellular network technology, a cellular band, and a frequency;

the network exit comprises a coverage loss or a controlled exit, and the network reentry condition comprises an automatic reentry attempt or a controlled reentry attempt;

augmenting the network connectivity context history with a cell change or a coverage loss;

based on at least a cell change or a successful network reentry attempt, augmenting a copy of the network topology stored on the UE;

based on at least a cell change, receiving at least a portion of the network topology.

the set of priority reentry cells comprises a single cell.

based on at least the least mobility data for the UE, predicting the network exit;

generating, on the UE, an alert for the predicted network exit;

tracking, by the UE, the mobility data for the UE;

attempting network reentry comprises attempting network reentry into a 4G cellular network; and attempting network reentry comprises attempting network reentry into a 5G cellular network.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of cell selection by a user equipment (UE), the method comprising:
   detecting, by the UE, a network exit;
   determining, by the UE, a network reentry condition, based on at least the network exit;
   based on at least mobility data for the UE and a network connectivity context history, determining, by the UE, using a machine learning (ML) component, a set of priority reentry cells;
   based on at least determining the network reentry condition, attempting network reentry with the set of priority reentry cells;
   based on at least failing network reentry with the set of priority reentry cells, attempting network reentry with a cell search; and
   based on at least the mobility data for the UE, the network connectivity context history, and the ML component not providing a successful set of priority reentry cells, determining, by the UE, the set of priority reentry cells based on at least mobility data for the UE and a network topology.

2. The method of claim 1, further comprising:
   learning, by the ML component, a network reentry attempt result.

3. The method of claim 1, further comprising:
   based on at least the least mobility data for the UE, predicting the network exit and generating, on the UE, an alert for the predicted network exit.

4. The method of claim 1, further comprising:
   based on at least a cell change, receiving at least a portion of the network topology.

5. The method of claim 1, wherein the set of priority reentry cells identifies at least one cell feature selected from the list consisting of:
   a cellular network technology, a cellular band, and a frequency.

6. The method of claim 1, wherein the network exit comprises a coverage loss or a controlled exit, and the network reentry condition comprises an automatic reentry attempt or a controlled reentry attempt.

7. The method of claim 1, further comprising:
   augmenting the network connectivity context history with a cell change or a coverage loss.

8. A system for cell selection by a user equipment (UE), the system comprising:
   a processor; and
   a computer-readable medium storing instructions that are operative upon execution by the processor to:
   detect, by the UE, a network exit;
   determine, by the UE, a network reentry condition, based on at least the network exit;
   based on at least mobility data for the UE and a network connectivity context history, determine, by the UE, using a machine learning (ML) component, a set of priority reentry cells;
   based on at least determining the network reentry condition, attempt network reentry with the set of priority reentry cells;
   based on at least failing network reentry with the set of priority reentry cells, attempt network reentry with a cell search; and
   based on at least the mobility data for the UE, the network connectivity context history, and the ML component not providing a successful set of priority reentry cells, determine, by the UE, the set of priority reentry cells based on at least mobility data for the UE and a network topology.

9. The system of claim 8, wherein the operations are further operative to:
   learn, by the ML component, a network reentry attempt result.

10. The system of claim 8, wherein the operations are further operative to:
    based on at least the least mobility data for the UE, predicting the network exit; and generating, on the UE, an alert for the predicted network exit.

11. The system of claim 8, wherein the operations are further operative to:
    based on at least a cell change or a successful network reentry attempt, augment a copy of the network topology stored on the UE.

12. The system of claim 8, wherein the set of priority reentry cells identifies at least one cell feature selected from the list consisting of:
    a cellular network technology, a cellular band, and a frequency.

13. The system of claim 8, wherein the network exit comprises a coverage loss or a controlled exit, and the network reentry condition comprises an automatic reentry attempt or a controlled reentry attempt.

14. The system of claim 8, wherein the set of priority reentry cells comprises a single cell.

15. One or more computer storage devices having computer-executable instructions stored thereon, which, upon execution by a computer, cause the computer to perform operations comprising:
    detecting, by a user equipment (UE), a network exit;
    determining, by the UE, a network reentry condition, based on at least the network exit;
    based on at least mobility data for the UE and a network connectivity context history determining, by the UE, using a machine learning (ML) component, a set of priority reentry cells;
    based on at least determining the network reentry condition, attempting network reentry with the set of priority reentry cells;
    based on at least failing network reentry with the set of priority reentry cells, attempting network reentry with a cell search; and
    based on at least the mobility data for the UE, the network connectivity context history, and the ML component not providing a successful set of priority reentry cells, determining, by the UE, the set of priority reentry cells based on at least mobility data for the UE and a network topology.

16. The one or more computer storage devices of claim 15, wherein the operations further comprise:
    learning, by the ML component, a network reentry attempt result.

17. The one or more computer storage devices of claim 15, wherein the operations further comprise:

based on at least a cell change, receiving at least a portion of the network topology.

18. The one or more computer storage devices of claim 15, wherein the set of priority reentry cells identifies at least one cell feature selected from the list consisting of:
a cellular network technology, a cellular band, and a frequency.

19. The one or more computer storage devices of claim 15, wherein the network exit comprises a coverage loss or a controlled exit, and the network reentry condition comprises an automatic reentry attempt or a controlled reentry attempt.

20. The one or more computer storage devices of claim 15, wherein the operations further comprise:
based on at least the least mobility data for the UE, predicting the network exit; and
generating, on the UE, an alert for the predicted network exit.

* * * * *